UNITED STATES PATENT OFFICE 2,477,543

FLUORINATED POLYARYL HYDROCARBONS

Moushy Markarian, North Adams, Mass., assignor to Sprague Electric Company, North Adams, Mass., a corporation of Massachusetts No Drawing. Application May 18, 1946, Serial No. 670,854

5 Claims. (Cl. 260—649)

This invention relates to new fluorinated hydrocarbons and more particularly refers to aryl hydrocarbons having substituted thereon at least one trifluoromethyl group.

It is an object of this invention to produce new chemically stable aryl hydrocarbons which have fluorine atoms substituted thereon. In a more restricted sense, the invention is concerned with trifluoromethyl-substituted polyaryl compounds possessing unusual chemical and electrical stability. Additional objects will become apparent from the following description and claims.

These objects are attained in accordance with the present invention which is directed to a polyaryl hydrocarbon having a trifluoromethyl group substituted on at least one aryl ring. In a more restricted sense, this invention is concerned with a diaryl hydrocarbon having a trifluoromethyl group substituted on at least one aryl ring. In one of its preferred embodiments the invention is concerned with a diaryl ethane hydrocarbon having a trifluoromethyl group substituted on an aryl ring. In another of its limited embodiments the invention is concerned with a diaryl ethylene hydrocarbon having a trifluoromethyl group substituted on an aryl ring.

According to my invention, I have found that certain polyaryl hydrocarbons having substituted thereon one or more trifluoromethyl groups possess extremely desirable characteristics. My new compounds conform to the following general formula:

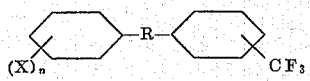

wherein R represents an ethylidene or vinylidene group, X represents hydrogen or a monovalent substituent, and $n$ represents an integer.

Among the preferred compounds of the invention which conform to the general formula, and wherein R represents an ethylidene group are the following:

1-(3 trifluoromethyl phenyl)-1-phenyl ethane
1-(2 trifluoromethyl phenyl)-1-phenyl ethane
1-(4 trifluoromethyl phenyl)-1-phenyl ethane
1-(2 trifluoromethyl phenyl)-1-(2 chlorophenyl) ethane
1-(3 trifluoromethyl phenyl)-1-(2 chlorophenyl) ethane
1-(4 trifluoromethyl phenyl)-1-(2 chlorophenyl) ethane
1-(2 trifluoromethyl phenyl)-1-(4 chlorophenyl) ethane
1-(3 trifluoromethyl phenyl)-1-(4 chlorophenyl) ethane
1-(4 trifluoromethyl phenyl)-1-(4 chlorophenyl) ethane Among the same series of compounds, and wherein R represents a vinylidene group, are the following:

1-(3 trifluoromethyl)-1-phenyl ethylene
1-(2 trifluoromethyl phenyl)-1-phenyl ethylene
1-(4 trifluoromethyl phenyl)-1-phenyl ethylene
1-(2 trifluoromethyl phenyl)-1-(2 chlorophenyl) ethylene
1-(3 trifluoromethyl phenyl)-1-(2 chlorophenyl) ethylene
1-(2 trifluoromethyl phenyl)-1-(4 chlorophenyl) ethylene
1-(4 trifluoromethyl phenyl)-1-(2 chlorophenyl) ethylene
1-(3 trifluoromethyl phenyl)-1-(4 chlorophenyl) ethylene
1-(4 trifluoromethyl phenyl)-1-(4 chlorophenyl) ethylene It is to be understood that other substituents such as chlorine, fluorine, amino group, alkyl groups, nitro groups, sulfonic acid groups, aryl groups, etc., may be substituted on either the aromatic or aliphatic hydrocarbon radicals of the above compounds. For electrical applications, it is generally advisable to avoid the presence of any elements other than carbon, hydrogen, fluorine and chlorine. For lubrication purposes it is often desirable to limit the elements to carbon, hydrogen and fluorine. When the compounds are to be used as fine chemicals, pharmaceuticals, dye stuff intermediates, and other applications, it is contemplated that additional active group may be substituted on one or more of the aryl radicals.

The following examples describe the preparation of the herein-described compounds.

EXAMPLE I

*Preparation of 1-(3 trifluoromethyl phenyl)-1-phenyl ethylene*

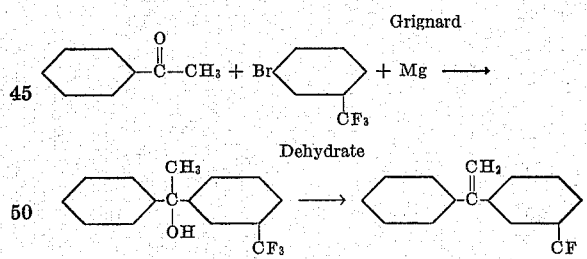

25 gms. of magnesium in 600 cc. dry ether were placed in a 2 liter 3 necked flask with stirrer, reflux and dropping funnel. To this was added 225 gms. m-bromo benzotrifluoride as usual for Grignard reaction. The mixture was refluxed ½ hour and to it was added dropwise 120 gms. acetophenone dissolved in a little ether. When all of the latter was added, the mixture was refluxed for ½ hour and then hydrolyzed with ice and HCl. The product was worked up as usual, separating the organic layer, washing, drying with MgSO₄, filtering and distilling off the ether. A reflux condenser with water takeoff adapter was attached. There was then added 2.5 gms. of KHSO₄, followed by heating until the required amount of H₂O came off. Then the product was cooled and ether added. The solution was washed with dilute NaOH, water, then dried, filtered and the ether removed. The product was distilled at 1 mm., B. P. 82° C. Yield, 204 gms. or 82.3%.

EXAMPLE II

*Preparation of 1-(3 trifluoromethyl phenyl)-1-phenyl ethane*

204 gms. of the ethylene compound made in Example I was made up to 500 cc. with cyclohexane. Raney nickel was added (8-9 gms.) and the mixture was placed in a bomb and hydrogenated at 50-60° C. and 700 to 800 p. s. i. pressure. The bomb was cooled and the product removed. The Raney nickel was filtered off and the cyclohexane distilled off. The residue was distilled at 1 mm., B. P. 76.5-77.5° C., yield 184 gms. (88.5%).

Fractionated at ½ mm. B. P. 67.5-69° C.
Refractive index 20° C.=1.5138
Density 20/4=1.160

The remaining compounds embraced herein may be produced by suitable modifications of the above examples, employing the procedures therein set forth.

As mentioned heretofore the compounds disclosed herein are useful in a number of fields, and particularly as dielectrics. They possess a high dielectric constant and a low power factor under normal conditions. Electrical properties such as these are unusual for polar type liquid dielectric materials.

As many apparently widely different embodiments of this invention may be made without departing from the spirit and scope hereof, it is to be understood that the invention is not limited to the specific embodiments hereof except as defined in the appended claims.

What I claim is:

1. Compounds having the following general formula:

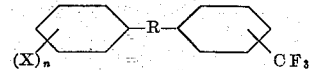

wherein R represents a member selected from the class consisting of ethylidene and vinylidene groups, X represents a member selected from the class consisting of hydrogen and monovalent substituents, and $n$ represents an integer.

2. Compounds having the following general formula:

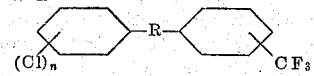

wherein R represents a member selected from the class consisting of ethylidene and vinylidene groups and $n$ represents an integer.

3. 1-(3 trifluoromethylphenyl)-1-phenyl ethylene.

4. 1-(3 trifluoromethylphenyl)-1-phenyl ethane.

5. 1-(3-trifluoromethyl phenyl)-1-(4 chlorophenyl) ethylene.

MOUSHY MARKARIAN.

REFERENCES CITED

The following references are of record in the file of this patent:

UNITED STATES PATENTS

| Number | Name | Date |
|---|---|---|
| 2,063,979 | Booth | Dec. 15, 1936 |
| 2,085,736 | Calcott et al. | July 6, 1937 |
| 2,174,512 | Holt et al. | Oct. 3, 1939 |

OTHER REFERENCES

Gilman, "Organic Chemistry," 2nd ed., 1943, pages 500 and 510.

Whitmore, "Organic Chemistry," 1937, pages 30 and 32.